(12) United States Patent
Bermperidis et al.

(10) Patent No.: US 12,314,272 B2
(45) Date of Patent: May 27, 2025

(54) ONLINE META-LEARNING FOR SCALABLE ITEM-TO-ITEM RELATIONSHIPS

(71) Applicant: Apple Inc., Cupertino, CA (US)

(72) Inventors: Dimitrios Bermperidis, Seattle, WA (US); Sofia M. Nikolakaki, San Jose, CA (US); Rabi S. Chakraborty, San Jose, CA (US); Rajesh Kumar, Singapore (SG); Chandrasekar Venkataraman, Los Altos, CA (US); Natalia G. Silveira, Campbell, CA (US); Puja Das, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 17/934,854

(22) Filed: Sep. 23, 2022

(65) Prior Publication Data
US 2024/0054138 A1 Feb. 15, 2024

(30) Foreign Application Priority Data
Aug. 12, 2022 (EP) ..................................... 22386056

(51) Int. Cl.
*G06F 17/00* (2019.01)
*G06F 7/00* (2006.01)
*G06F 8/61* (2018.01)
*G06F 16/2457* (2019.01)

(52) U.S. Cl.
CPC .......... *G06F 16/24578* (2019.01); *G06F 8/61* (2013.01)

(58) Field of Classification Search
CPC ............................. G06F 16/24578; G06F 8/61
USPC ........................................................ 707/748
See application file for complete search history.

(56) References Cited

U.S. PATENT DOCUMENTS

| | | | | |
|---|---|---|---|---|
| 6,993,532 | B1 * | 1/2006 | Platt | G06F 16/634 707/916 |
| 8,032,506 | B1 * | 10/2011 | Gregov | G06Q 30/02 707/706 |
| 8,751,516 | B1 * | 6/2014 | Wong | G06F 16/9535 707/707 |
| 2003/0221541 | A1 * | 12/2003 | Platt | G06F 16/683 707/E17.009 |
| 2008/0040389 | A1 * | 2/2008 | Seth | G06F 16/9577 |
| 2010/0138427 | A1 * | 6/2010 | Van De Par | G06F 16/639 707/E17.014 |
| 2011/0060738 | A1 * | 3/2011 | Gates | G06F 16/68 707/E17.046 |
| 2012/0072283 | A1 * | 3/2012 | DeVore | G06Q 30/0251 705/14.49 |

(Continued)

OTHER PUBLICATIONS

Guo, et al., "AppNet: Understanding App Recommendation in Google Play," Proceedings of the 29th ACM International Conference on Information & Knowledge Management, ACMPUB 27, New York, NY, USA, Aug. 27, 2019, XP058708468, DOI: 10.1145/3340496.3342757, ISBN: 978-1-4503-6859-9.

*Primary Examiner* — Pavan Mamillapalli
(74) *Attorney, Agent, or Firm* — Blank Rome LLP (57) ABSTRACT

A distribution platform interface is presented with respect to a seed item landing page. The seed item landing page includes a recommendation section. The items listed in the recommendation section are selected from a framework that is configured to provide recommendations of candidate items based on a given seed app and relationship type, and which is configured to handle multiple relationship types.

20 Claims, 7 Drawing Sheets

(56) References Cited

U.S. PATENT DOCUMENTS

| | | | | |
|---|---|---|---|---|
| 2012/0072968 | A1* | 3/2012 | Wysopal | G06F 21/577 |
| | | | | 726/1 |
| 2012/0129503 | A1* | 5/2012 | Lindeman | H04L 67/303 |
| | | | | 455/414.1 |
| 2012/0173655 | A1* | 7/2012 | McEntee | G06F 16/1834 |
| | | | | 709/216 |
| 2012/0290583 | A1* | 11/2012 | Mahaniok | G06Q 30/02 |
| | | | | 707/741 |
| 2014/0289214 | A1* | 9/2014 | Wong | G06F 16/248 |
| | | | | 707/706 |
| 2015/0169759 | A1* | 6/2015 | Ronen | G06F 16/26 |
| | | | | 707/706 |
| 2016/0057569 | A1* | 2/2016 | Soto Matamala | H04L 43/106 |
| | | | | 455/456.3 |
| 2016/0321052 | A1* | 11/2016 | Sharifi | H04M 1/72406 |
| 2017/0075910 | A1 | 3/2017 | Soto Matamala | |
| 2017/0076353 | A1* | 3/2017 | Mehta | H04W 4/021 |
| 2017/0083527 | A1 | 3/2017 | Kumar | |
| 2018/0364998 | A1* | 12/2018 | Bastide | G06F 8/61 |
| 2019/0065217 | A1* | 2/2019 | Girdhar | G06F 9/44505 |
| 2019/0114668 | A1 | 4/2019 | Zhuo | |
| 2021/0218804 | A1 | 7/2021 | Fan | |

* cited by examiner

ONLINE META-LEARNING FOR SCALABLE ITEM-TO-ITEM RELATIONSHIPS

TECHNICAL FIELD

Embodiments described herein relate to an interface for applications hosted by a distribution platform. More particularly, embodiments described herein relate to determining and presenting related items for a seed application in a user interface.

BACKGROUND

In recent years, downloading of software applications (or "apps") from an on-line app store has become a popular method for obtaining software applications. An on-line app store allows users to download a software application onto their device—such as a desktop or laptop computer, smartphone, or other mobile device—and then install the app on their device. Prior to downloading an app, users often find apps within the app store. In response to a user search, the app store may provide results to the user—with a particular set of representative data, such as an icon, screenshot, text description, or the like.

BRIEF DESCRIPTION OF THE DRAWINGS

Embodiments described herein are illustrated by examples and not limitations in the accompanying drawings, in which like references indicate similar features. Furthermore, in the drawings, some conventional details have been omitted, so as not to obscure the inventive concepts described herein.

DETAILED DESCRIPTION

This disclosure relates to systems, methods, and computer readable media for providing improved recommended items according to one or more embodiments. In particular, embodiments described herein utilize an item-to-item relationship framework that models and computes different item-to-item relationship pairs for recommendation systems. As such, embodiments described herein provide a technique for identifying a seed item (i.e., an item a user is engaged with), and determining for that seed item, one or more recommended related items to the seed item, thus providing more relevant options, and ultimately improving user experience and increasing user engagement with the platform hosting the items. In some embodiments, the recommended related items are selected from a set of candidate items based on a target relationship. The item may be any digital item provided from a digital catalog.

This disclosure pertains to systems, methods, and computer readable media for providing improved suggested catalog items according to one or more embodiments. In particular, embodiments described herein select suggested results based on an item-to-item relationship framework which can identify appropriate candidate related items to the seed item based on a target relationship to that seed item. In some embodiments, the selected candidate related items are presented for display in an interface, such as a landing page, for a seed item. The framework represents a technical improvement to determining and selecting multiple recommendation sets based on differing relationship types by providing a single framework capable of handling multiple relationship types.

Some embodiments described herein utilize a composite relationship model. The composite relationship model may be based on an explicit item-to-item similarity model and an implicit item-to-item similarity model. While the explicit item-to-item similarity model is expressed as a sparse matrix, the implicit item-to-item similarity model may be provided in the form of cosine similarities of various item and embeddings. Each embedding may correspond to a different data source and capture different data modality. Thus, similarities between different types of embeddings may also capture different relationship types. The final composite relationship model may be configured to determine, for a particular seed item and relationship type, a set of one or more recommended items. Specifically, the set of one or more recommended items should relate to the seed item in a particular manner. For example, the composite relationship model may be configured to provide candidate items having a similarity with the application, a complementarity to be the application, and/or may be considered overlapping with the item. However, it should be understood that other relationship types may be modeled by the composite relationship model.

Figure 1:
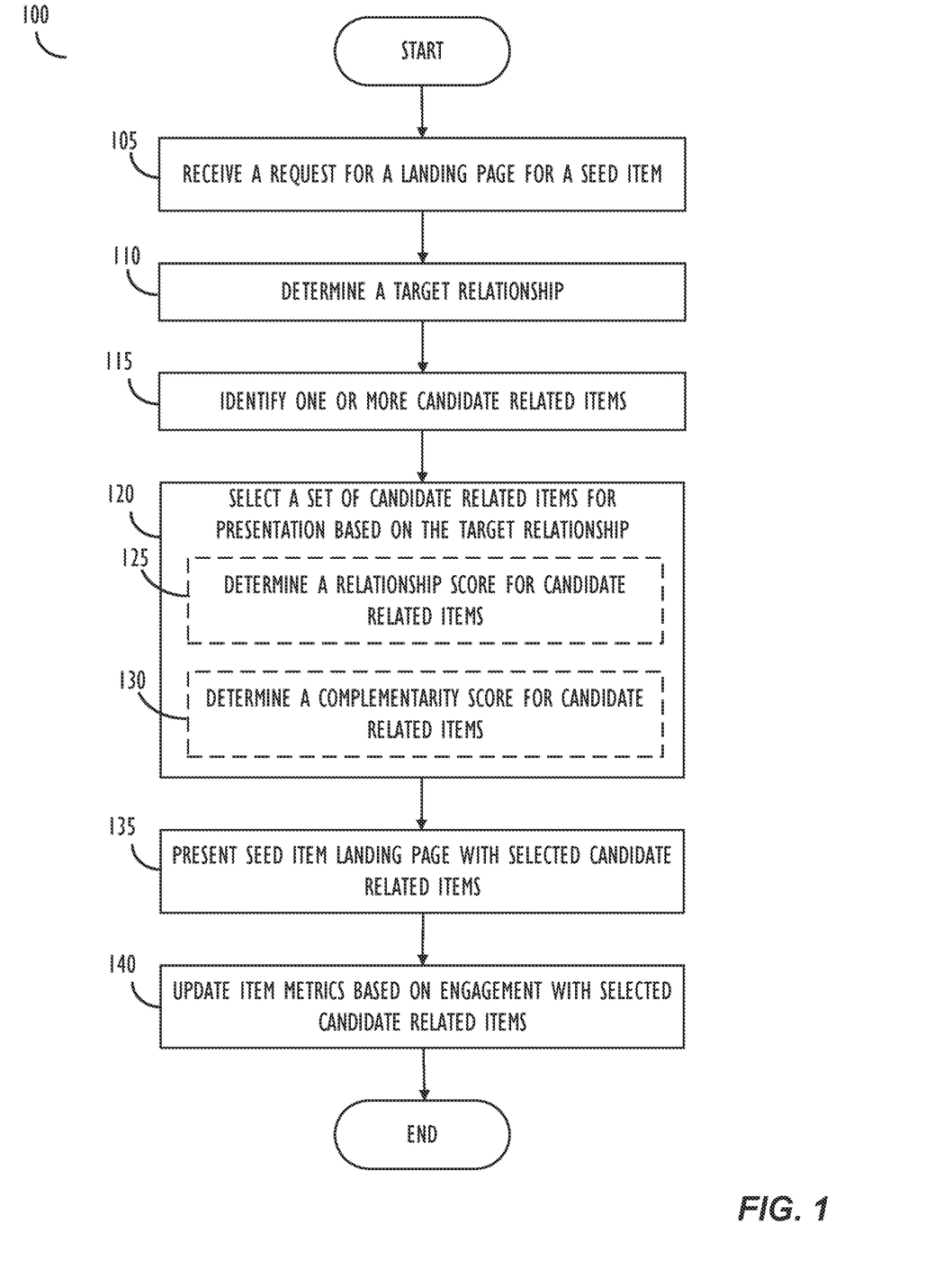
FIG. 1 illustrates a flowchart of a technique for selecting candidate related items in accordance with some embodiments.

FIG. 1 depicts a flowchart of a technique for selecting suggested related items in accordance with some embodiments. Although the various actions are depicted in a particular order, in some embodiments the various actions may be performed in a different order. In still other embodiments, two or more of the actions may occur simultaneously. According to yet other embodiments, some of the actions may not be required or other actions may be included. For purposes of clarity, the flowchart will be described with respect to various particular components. However, it should be understood that the various actions may be taken by alternative components, according to one or more embodiments.

The flowchart 100 begins at block 105, where a request is received for a landing page for a seed item. However, in some embodiments, the request may be received from another user interface for a digital catalogue hosting the seed item. The seed item may be any kind of digital item hosted on a digital distribution platform for which recommended related items can be provided. For example, the seed item may include an app, a media item, such as a music file or video item, an electronic game, an e-book, or the like. According to some embodiments, the seed item may be hosted on a platform which provides an interface from which the items (i.e., the seed item and the recommended items) may be accessed. The platform may further provide an information interface for each of the various items, such as a landing page for the apps hosted in the app store.

The flowchart continues at block 110, where a target relationship is determined. As described above, embodiments described herein may provide a framework from which multiple relationships may be determined. More specifically, the framework may provide recommendations in accordance with a variety of relationships for a given seed item. Example relationships may include, for example, similarity, overlapping, complementarity, sequence, or the like.

At block 115, one or more candidate related items are identified. The one or more candidate items identified at block 115 may include, for example, other items hosted by the platform, or a subset of items hosted by the platform. Said another way, the candidate related items can include the catalog of items hosted by the distribution platform. At block 120, a set of the candidate items is selected for presentation based on the target relationship (e.g., candidate related items). As described above, the candidate related items may be selected based on a target relationship. Examples of the target relationship may include, for example, similarity, complementarity, overlapping, or the like, and the target relationship may be determined in several ways, such as user input, application-based heuristics or parameters, user history, and the like. Each of these relationships may be associated with various parameters which define how the candidate related items may be selected from the can items, and multiple sets of recommendations may be provided by a single framework. In some embodiments, as shown at block 125, a relevance score may be determined for candidate related items. The relevance score will be described in greater detail below with respect to FIG. 3.

As such, at block 125, a relevance score is determined for the candidate related items with respect to the seed item. In some embodiments, the relevance score may be determined for a full set or a subset of the candidate items. Further, in some embodiments, the relevance score between the seed item and the candidate related items may be predetermined, and may be determined at block 125 by a lookup function. Similarly, selecting a set of candidate related items at block 120 may optionally include, at block 130, determining a complementarity score for candidate related items. According to one or more embodiments, complementarity indicates an item that does not provide the primary goal of the seed item but can be a companion item or item that helps a user complete their goal in using the seed item, or make better a user's overall experience with the seed item. As an example, a social media app may be enhanced by a photo editing app because a user can edit their photos prior to posting to social media app. By contrast, two different social media apps may be considered to have an overlapping relationship because they have the same primary goal. Further, the two social media apps are likely to be selected one over the other. As such, an overlapping candidate item has high similarity with the primary goal and content of the seed item in the user is likely to use an overlapping candidate item over the seed item, or conversely, the seed item over the candidate overlapping item.

In some embodiments, a determination of complementarity at block 130, may require a determination of similarity at block 125. For example, similarity may be determined in order to build a framework capable of providing a complementarity recommendation. However, in some embodiments, both relationship scores need not be determined. The set of candidate related items may be selected based on a determined target relationship. For example, if the target relationship is complementarity, then a set of items from the candidate items will be selected based on the complementarity score indicating high complementarity between the seed app and the selected set of candidate related apps. Additionally, or alternatively, as will be described below, complementary items may be selected based on a ranking of candidate related items based on various parameters and, thus, may not be associated with a particular score.

The flowchart continues at block 135, where the seed item landing page is presented with selectable candidate related items (i.e., the recommended related items). According to one or more embodiments, the seed item landing page may be an interface for the distribution platform hosting the seed item which provides information about the seed item and/or an opportunity to engage with the seed item. As an example, if the seed item is an album, a music app platform hosting the album may provide a landing page for the album with a section for recommendations related to the album. Those recommendations may include, for example, similar albums, media items, or the like having a predetermined relationship with the album that is the seed item. Further, it should be understood that in some embodiments the selected candidate related items may not be presented in the landing page, but rather another user interface for providing recommendations for the seed item.

The flowchart 100 concludes at block 140, where item metrics are updated based on detected engagement with the selected candidate related items presented in the seed item landing page. As an example, and one or more embodiments, if a user navigates to a landing page of one of the recommended related items presented, then that engagement may go toward determining relevance scores between the seed item and the candidate related item for which engagement was detected. As such, some embodiments described herein provide a feedback loop for a composite relationship model framework in which user engagement with presented candidate related items is considered. In some embodiments, detected engagement may be considered for additional similarity metrics. Further, in some embodiments, engagement may be considered in a more complex matter. As an example, data sets of user engagement may contain "triplets" that are tracking a data set that includes the seed item, positive candidates, and negative candidates. Positive candidates may be candidate related items that the user engagement, or example clicks on or directly downloaded or otherwise perform some action with. Negative candidates may be candidates for which the user is determined to have observed the recommendation, but no interaction was detected. For example, a negative candidate may be one for which the candidate related item was selected for presentation and presented on a landing page of a seed item. It may be determined that the negative candidate was not only selected for presentation by the framework and/or client device, but was actually displayed on the display device and not interacted with. As an example, a candidate related item which was selected for presentation, but for which a user did not scroll through a user interface in a manner such as to cause the candidate related item to be visible will not be considered a negative candidate in accordance with some embodiments.

Figure 2:
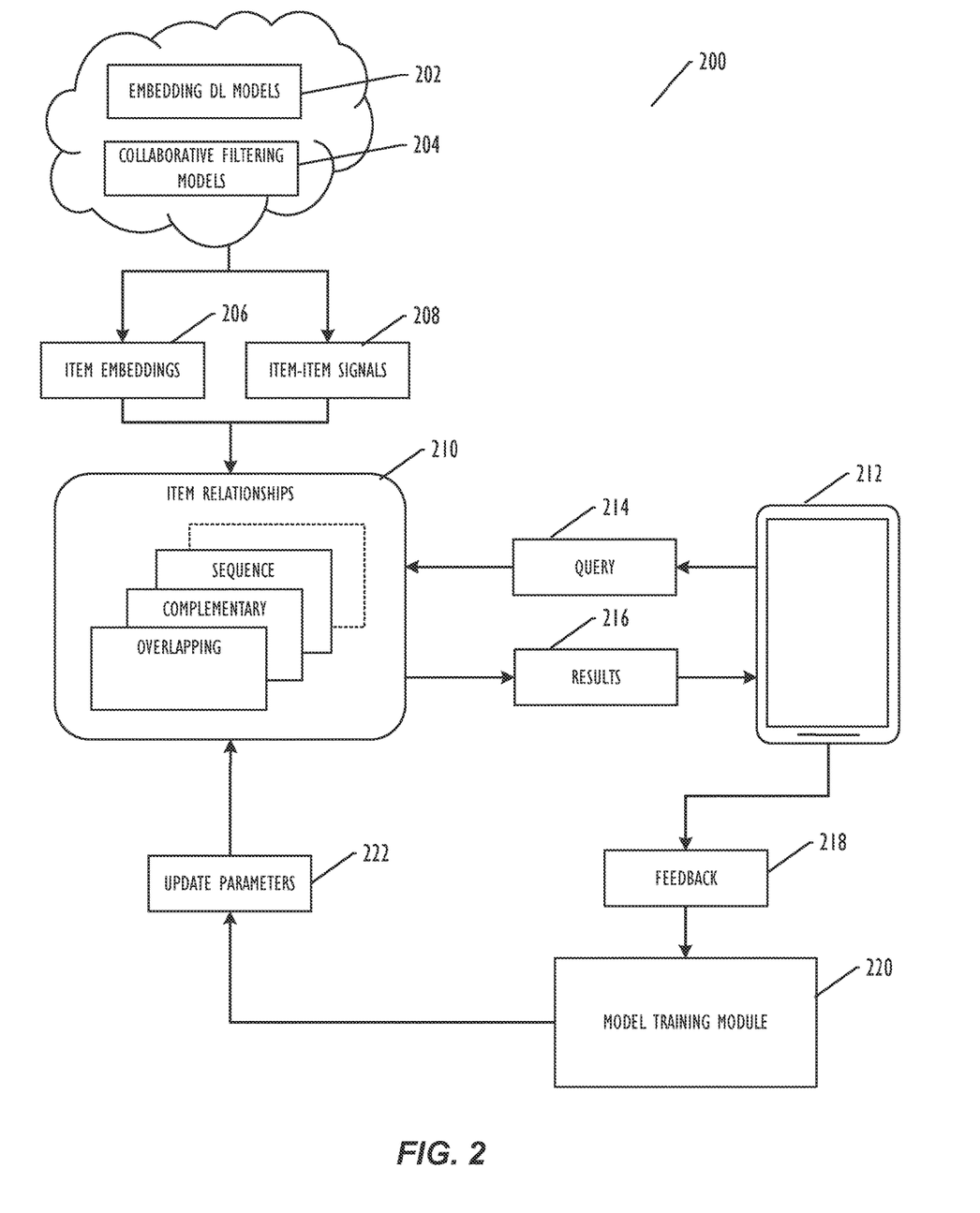
FIG. 2 illustrates a flow diagram of a technique for generating an item-to-item model, in accordance with some embodiments.

FIG. 2 illustrates a flow diagram of a technique for generating an item-to-item model, in accordance with some embodiments. As described above, embodiments described herein are directed to a composite relationship model which is configured to map multiple types of item-to-item relationships among candidate items. As described above, the composite relationship model may provide for a given seed item, a set of candidate related items for a given relationship, such as similarity, overlapping, complementarity, sequence, clones, and the like.

The flow diagram 200 includes embedding models 202. According to one or more embodiments, the embedding models may comprise implicit similarity models. In some embodiments, this type of item-to-item similarity arises upon applying for certain similarity function, such as cosine similarity, on a vector description or embedding, of an item. The term "implicit" arises from the fact that these embedding similarities are typically not precomputed, for example due to storage and computing limitations, overall item pairs. Rather, the embedding similarities are computed over a smaller set of item-to-item pairs after a filtering stage. According to some embodiments, an item may have multiple such embeddings that are produced by different models and using different data sources. Examples of the types of embeddings include, for example, consideration of content management tags associated with the items, consideration of similarities across descriptions of the items, and the like. According to some embodiments, the content management tags may be provided by a source of the item to provide description of information for the item. In some embodiments, the description of the item may be provided in narrative form, for example for presentation in a landing page for the item. Further, in some embodiments, the description may be applied to and machine learning model to identify topics within the description.

In addition, the flow diagram 200 includes consideration of collaborative filtering models 204. The collaborative filtering models 204 may be explicit item-to-item similarity models. In some embodiments, these item-to-item models are considered "explicit" because all item-to-item similarities are readily available as a matrix. Generally, the collaborative filtering model is based co-engagement metric between a seed item and candidate related items. In some embodiments, the co-engagement is represented as a number of users who have downloaded both items. In one or more embodiments, the similarity between two items is proportional to the number of users who have downloaded or otherwise engaged with both items, and inversely proportional to the sum of the squares of the popularities of the items.

As shown in flow diagram 200, the output of the embedding models 202 and the collaborative filtering models 204 include item embeddings 206 and item-to-item signals 208. The item embeddings 206 may arise from the embedding DL models 202, while the item-to-item signals 208 may arise from the collaborative filtering models 204. In some embodiments, the item embeddings 206 may include a set of embeddings from various data sources, as described above. The item-to-item signals 208 may include data related to the co-engagement score as described above with respect to the collaborative filtering models 204.

According to one or more embodiments, the item embeddings 206 and the item-to-item signals 208 may be combined to form item relationships 210. As described above, a singular framework can include relationship information for a set of items such that various recommendations can be obtained for a given seed app based on a requested relationship type. Examples include similar items, complementary items, sequential items, overlapping items, and the like. The item relationships 210 may form be composite relationship model, which may consider the item embeddings 206 and the item-to-item signals 208. According to some embodiments, the composite relationship model may be expressed as a parameterized weighted sum of various embedding similarities.

As described above, the item relationships 210 may be presented in a framework such that the framework may provide recommendations for a given seed item and relationship type. Said another way, the framework can process, as input, a seed item and relationship type to generate a set of recommended items. As such, a client device 212 may provide a user interface through which a user may submit a query 214 to the framework 210. The query may include, for example, a seed item, as well as an indication of a relationship type for which the recommended item should be selected. In some embodiments, the query 214 may be automatically determined based on user engagement with a user interface for a distribution platform. In this example, the seed item may be an item for which a user has navigated to a corresponding landing page. In some embodiments, the relationship type may be user driven or system driven. For example, user may select types of recommendations, such as similar items, complementary items, or the like. Additionally, or alternatively, the relationship type may be automatically selected, or system defined. For example, certain pages or items may be associated with particular relationship types, or the description platform may determine a relationship type, which should be queried. As another example, the relationship type queried may be determined based on more complex parameters, such as user engagement with the seed item or other contextual information. As an example, if the seed item is not yet downloaded, then the recommended items may be selected based on a similarity or overlapping relationship type, whereas if the seed item has been downloaded, then the candidate relationship items may be selected based on their complementarity to the seed item.

As described above, in some embodiments, the framework includes a feedback loop. As such, the interaction with the client device 212 with particular recommended items may result in feedback 218 which is fed back into the system. As described above, the feedback may be in the form of positive and/or negative data or interaction with recommended items presented to a user in a user interface. For example, the feedback 218 may be in the form of a triplet which includes the seed item, one or more positive candidates, and one or more negative candidates presented in association with the seed item. A positive candidate may be one with which the user engages in association with the seed item. For example, if the recommended item is presented in a user interface of a landing page of the seed item, and a user engages with the recommended item, such as navigating to a landing page for the recommended item and/or downloading the recommended item, the recommended item will could be considered to be a positive candidate. Conversely, a negative candidate may be a recommended item for the seed item which has been presented to the user and which the user did not interact with. In some embodiments, a negative candidate may also indicate that the candidate was viewed by the user (for example, the candidate related item was presented in a user interface in a manner such that the candidate related item was visible to a user using the interface), but which was not interacted with by the user.

According to some embodiments, the collected feedback 218 may be used by a model training module 220 to further optimize similarity weights and/or parameters for the framework. In some embodiments, the feedback 218 is used to minimize a loss function based on the feedback data set. As such, the data associated with the framework can be constantly updated and expanding as new users/items/engagement actions are added. Further, user behavior and interaction with the recommended items may change in a way that is not predictable and, as such, the feedback training by the model training module 220 can be configured to quickly reflect changes in user behavior in updated parameters 222.

Figure 3:
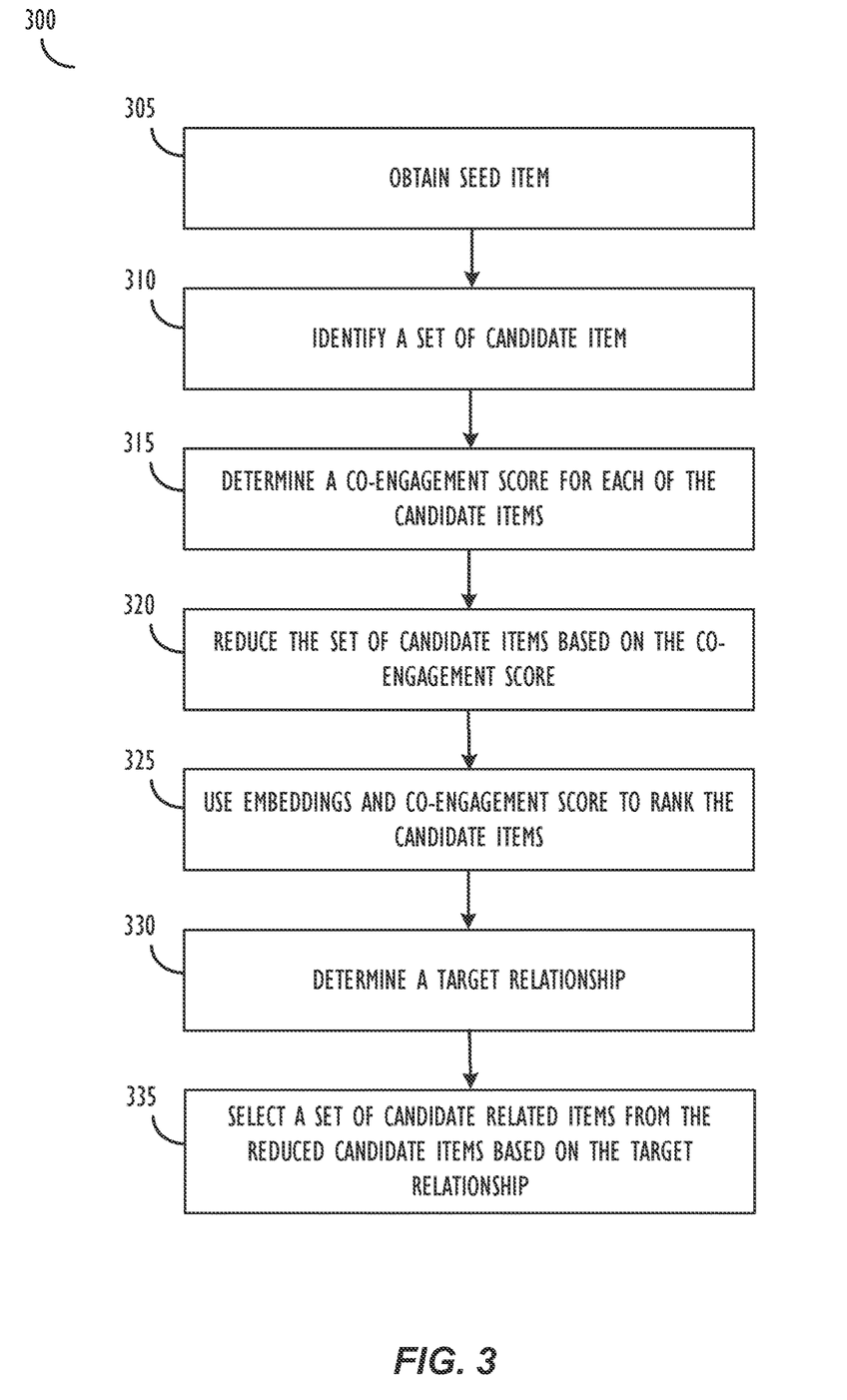
FIG. 3 illustrates a flowchart of a technique for selecting candidate related items, according to some embodiments.

According to one or more embodiments, the framework can be utilized to provide recommendations based on a variety of relationship types. FIG. 3 illustrates a flowchart of a technique for selecting suggested items based on similarity, according to some embodiments. Although the various actions are depicted in a particular order, in some embodiments the various actions may be performed in a different order. In still other embodiments, two or more of the actions may occur simultaneously. According to yet other embodiments, some of the actions may not be required or other actions may be included. For purposes of clarity, the flowchart will be described with respect to various particular components. However, it should be understood that the various actions may be taken by alternative components, according to one or more embodiments.

The flowchart 300 begins at block 305, where a seed item is obtained. As described above, the seed item may be obtained when a user navigates a distribution platform interface to view information about the seed item, such as an on the landing page for the seed item. The seed item may be any such items provided by recommendation and/or digital distribution platform. At block 310, a set of candidate items are identified. The set of candidate items may include, for example, additional items hosted by the distribution platform. In some embodiments, the one or more candidate items include, for example, a subset of items hosted by the platform for a particular seed item. Said another way, the candidate related items can include some or all the catalog of items hosted by the distribution platform. In some embodiments, the set of candidate items may be identified based on user information, such as a user profile. As an example, a user profile may be associated with a child's account and, as such, hosted items may be excluded from the candidate items which include sensitive subject matter, or which are otherwise indicated by the platform to be inappropriate for the particular account.

The flowchart 300 continues at block 315, where a co-engagement score for each of the candidate items is determined. According to one or more embodiments, co-engagement may be based on a representation of a number of users who have engaged with the seed item and who have also engaged with each of the candidate items. For example, co-engagement may be based on downloads of items, opening of items, navigation to item information pages, and/or the like. In some embodiments, the co-engagement information may be represented in the form of a sparse vector. As such, the co-engagement score for a particular candidate item may be identified from the sparse vector. At block 320, the candidate items are reduced based on the co-engagement scores. In some embodiments, a threshold co-engagement score may be predetermined, and may be utilized to determine the subset of candidate items which should be considered for similarity. In some embodiments, the candidate items may be reduced to a particular percentile of scored items. Accordingly, the subset of candidate items from which recommendations are determined are written deuced to a set of items for which co-engagement among the user population is high.

The flowchart continues at block 325, where embeddings are used to rank the candidate items. As described above, the embeddings may be provided in the form of embedding DL models as shown at block 202. Additionally, or alternatively, the embeddings may come from other sources. For example, topic embeddings can be created from a, Latent Dirichlet Allocation ("LDA") model, tag embeddings may be created from tags from a content management team, and the like. Further, the embeddings may be associated with implicit item-to-item similarity, and may provide correspondence data from different data sources, and thereby capture different data modality. According to one or more embodiments, the embeddings may indicate relationships among the candidate items, and the seed item, such as tag embeddings assigned by a tagging team or otherwise provided as content management tags, description embeddings based on a description of the item provided within the platform, and/or topic embeddings, which may be presented as sparse vectors, for example, computed using the LDA topic model. In some embodiments, this implicit type of item-to-item similarity may be represented as a vector description of the item. Embeddings may be based on additional data sources, such as engagement within a search interface. For example, whether a seed app and a candidate app are engaged with from within search results for a common query may be provided as an embedding.

Once the candidate items are ranked, a target relationship is determined at block 330. However, it should be understood that in some embodiments, the target relationship may be determined earlier in the flow, as the various processes described herein are merely presented in an exemplary sequence, and may actually occur in a different sequence. The framework may be configured to support multiple types of relationships, such as similarity, overlapping, clones, complementarity, and the like. The flowchart concludes at block 335, where a set of candidate related items are selected from the reduced candidate items based on the target relationship. In some embodiments, different relationships necessitate selecting from among the ranked candidate items in a different manner. For example, and overlapping candidate item will have a high overlap with the seed item with respect to the primary goal of the item and use of the item. By contrast, a complementary item will not have the primary goal of the seed item, but may be a companion item that helps a user complete their goal with the seed item, or otherwise improve the experience of using the seed item. Complementary items may be found among the reduced candidate items for which the embeddings are dissimilar. The overlapping apps may be selected from among the reduced candidate items based on having similar values among the embeddings.

Figure 4:
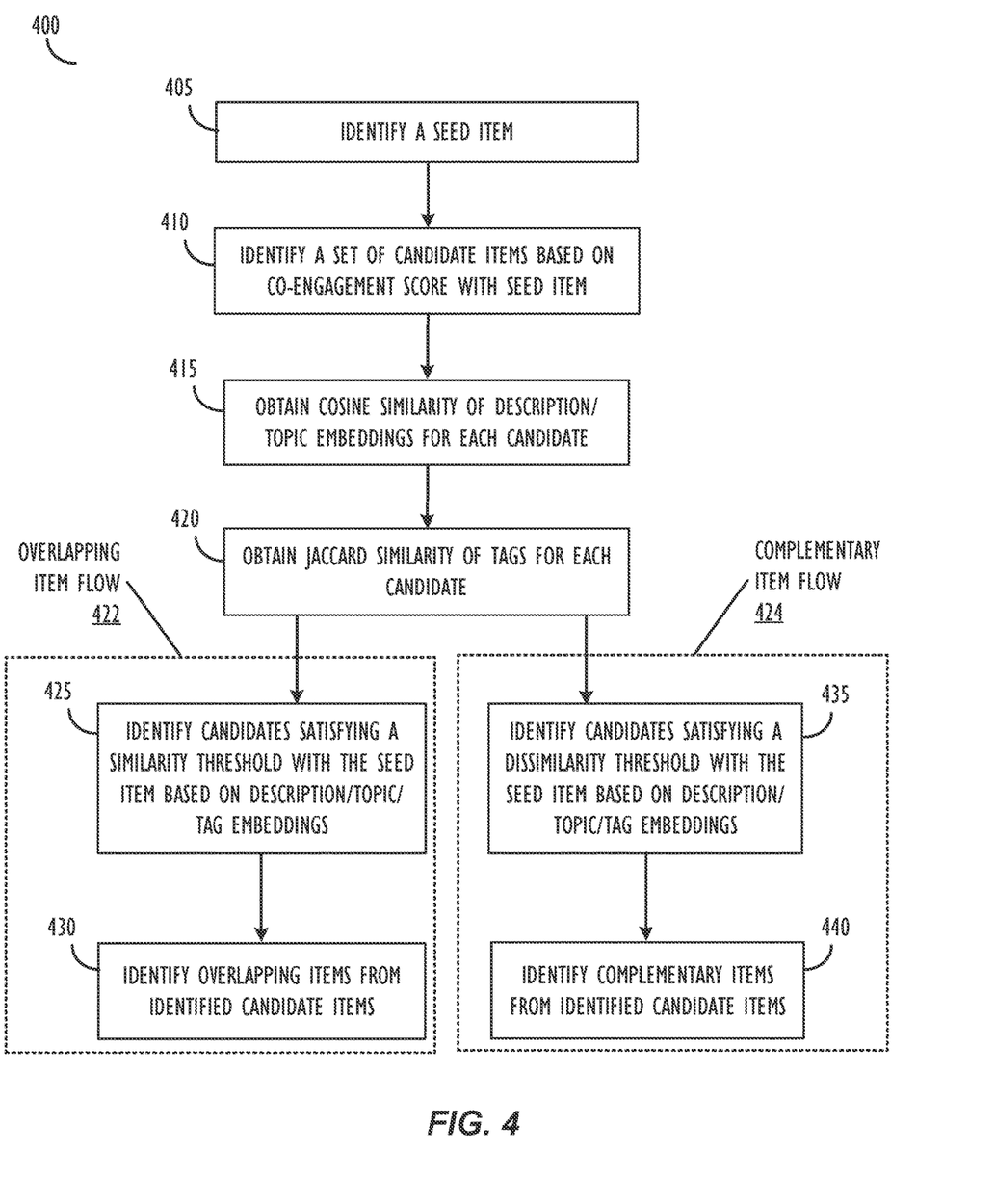
FIG. 4 illustrates a flowchart depicting a relationship between a technique for selecting overlapping items and a technique for selecting complementary items, according to some embodiments.

FIG. 4 illustrates a flowchart depicting a relationship between a technique for selecting overlapping items and a technique for selecting complementary items, according to some embodiments. Although the various actions are depicted in a particular order, in some embodiments the various actions may be performed in a different order. In still other embodiments, two or more of the actions may occur simultaneously. According to yet other embodiments, some of the actions may not be required or other actions may be included. For purposes of clarity, the flowchart will be described with respect to various particular components. However, it should be understood that the various actions may be taken by alternative components, according to one or more embodiments.

The flowchart 400 begins at block 405, where a see item is identified. As described above, the see item may be determined in a number of ways. Generally, a seed item is identified when a user engages with an item such that recommended related items should be presented to the user. For example, the seed item may be identified when a user navigates to an informational page, such as a landing page, for the particular item. As another example, the seed item may be identified based on a search query received for the particular item, or the like.

The flowchart continues to block 410, where a set of candidate items are identified based on a co-engagement score with the seed item. The candidate items may be selected from among a same digital distribution platform as the seed item. In some embodiments, a collaborative filtering model is used to retrieve items with a high co-engagement signal. Such a co-engagement signal may indicate that the seed item and the candidate item with the high co-engagement score are often downloaded or otherwise accessed by a common user.

At block 415 of flowchart 400, a cosine similarity is obtained for various embeddings for each candidate. The embeddings may include, for example, description embeddings, topic embeddings, content tags, and the like. Further, at block 420, a Jaccard similarity is obtained for the tax for each candidate item.

As indicated in flowchart 400, numerous steps are performed by the framework regardless of a target relationship. Specifically, blocks 405-420 are depicted as being performed for determining overlapping items as shown at 422, as well as for determining complementary items as shown at 424. As such, the framework can be used for both overlapping recommendations, as well as complementary recommendations. Although not shown, it should be understood that in some embodiments the framework can be used for additional relationship types in a similar manner.

Generally, similarities and dissimilarities are computed for each seed and candidate item pair for the embeddings. Thus, regarding the overlapping item flow 422, at block 425, candidate items are identified that satisfy a similarity threshold with respect to the seed item based on the embeddings (e.g., description, topic, and tag embeddings). In some embodiments, the similarity threshold may be based on a relevance score. Additionally, or alternatively, the similarity threshold may be a predetermined percentile of the candidate items based on the relevance score or the like. Then, at block 430, overlapping items are identified based on the candidate items identified satisfying the similarity threshold. As such, in some embodiments, the overlapping items may be determined to include all the items which satisfied the similarity threshold. Alternatively, in some embodiments, the overlapping items may be a subset of the identified candidate items satisfying the similarity threshold, for example based on a number of recommendation items required of for a particular use.

Further, regarding the complementary item flow 424, at block 435, candidate item are identified that satisfy a dissimilarity threshold with respect to the seed item based on the embeddings (e.g., description, topic, and tag embeddings). That is, the dissimilarity threshold indicates that the seed item and the candidate item are substantially different when considering topic, tag, and description embeddings. In some embodiments, the dissimilarity threshold may be based on a relevance score. Additionally, or alternatively, the dissimilarity threshold may be a predetermined percentile of the candidate items based on the relevance score or the like. Then, at block 440, complementary items are identified based on the candidate items identified satisfying the dissimilarity threshold. As such, in some embodiments, the complementary items may be determined to include all the items which satisfied the dissimilarity threshold. Alternatively, in some embodiments, the complementary items may be a subset of the identified candidate items satisfying the dissimilarity threshold, for example based on a number of recommendation items required of for a particular use.

While a single framework can be used for multiple relationship types, in some embodiments, the various embeddings may be differently considered based on the target relationship. For example, the weights of importance of each of description/topic/description embeddings for the overlapping and complementary relationships as described above can be learned using the item-to-item relationship model framework.

Figure 5A:
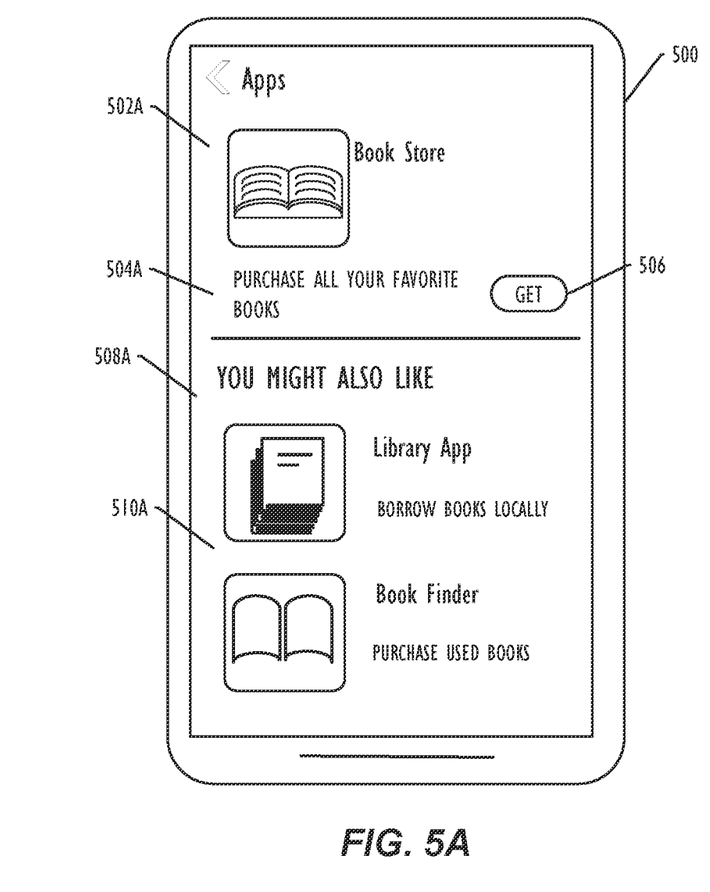
FIGS. 5A-5B depict example interfaces with candidate related items in accordance with one or more embodiments.
Figure 5B:
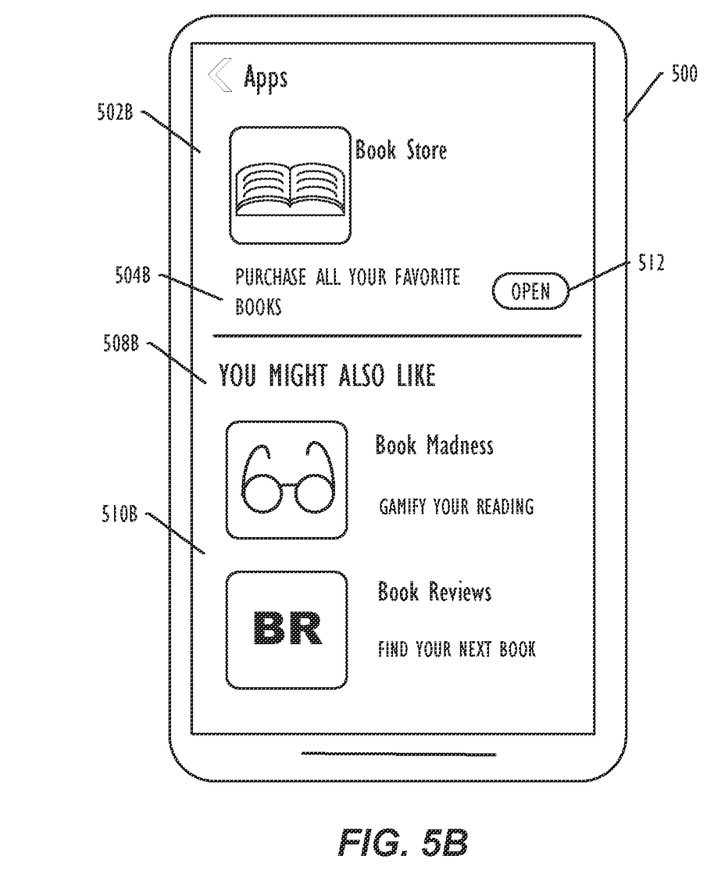

FIGS. 5A-B include example interfaces on an electronic device 500 and which recommended items are presented. The electronic device 500 may be any kind of electronic device which uses an interface to provide recommended items to a user. Further, the electronic device 500 may be used to access hosted items, such as digital media, applications, service, and the like, for example, through a browser or through a platform interface.

The electronic device 500 includes a display on which a seed item landing page 502A is presented. In this example the seed item landing page 502A shows a landing page for an application called Book Store. The seed item landing page includes a description for the Book Store application 504, which says "purchase all your favorite books." In addition, the seed item landing page 502A includes a user input component 506 to download the Book Store application. For purposes of this example, the user input component 506 says "GET" because the Book Store application is not currently downloaded.

As shown the landing page 502A includes a recommendation section 508A which includes candidate related items in the form of recommended applications also hosted on the distribution platform. As described above, the electronic device 500 may transmit a query to the framework to obtain a set of recommended items based on a seed item and a particular relationship type. For purposes of this example, the framework has returned recommended apps for which there is an overlapping relationship type. As such, the recommended items 510A include other applications which can be used to obtain books, such as Library Apps (described as "Borrow books locally") and Book Finder (described as "Purchase used books"). For purposes of this example, it may be considered that the Book Store application includes a sufficiently high co-engagement score with the Library App and the Book Finder application, and the Book Store application has a sufficiently high relevance score with the Library App and the Book Finder to be selected as candidate related items. According to some embodiments, the related items 510A may be presented in association with selectable input components which allow the user to engage with the recommended item, such as downloading the item and/or navigating to a landing page for the item within the framework.

By contrast, turning to FIG. 5B, the electronic device 500 includes a display on which a seed item landing page 502B is presented at a different time. In this example the seed item landing page 502B shows an updated landing page for the application called Book Store. The seed item landing page continues to include a description for the Book Store application 504, which says "purchase all your favorite books." In addition, the seed item landing page 502B includes a user input component 512 to open the Book Store application. That is, for purposes of this example, the user input component 512 says "OPEN" because the Book Store application is currently downloaded on the electronic device 500 and available to open.

As shown the landing page 502B includes a recommendation section 508B which includes candidate related items in the form of recommended applications also hosted on the distribution platform. As described above, the electronic device 500 may transmit a query to the framework to obtain a set of recommended items based on a seed item and a particular relationship type. For purposes of this example, the framework has returned recommended apps for which there is a complementary relationship type. For example, because the application is already downloaded, in some embodiments, it may be determined that the user experience may be improved by providing candidate items which enhance the user experience with the downloaded application, rather than providing alternatives to the application. As such, the recommended items 510B include enhancing related applications which can be improve the user experience of the Book Store application. As such, the recommendation section 508B includes a Book Madness application, which is described to the user as "Gamify your reading." In addition, the Book Reviews application is described as "Find your next book." For purposes of this example, it may be considered that the Book Store application includes a sufficiently high co-engagement score with the Book Madness application and the Book Reviews application, and the Book Store application has a sufficiently low relevance score with the Book Madness application and the Book Reviews application to be selected as candidate related items (thereby indicating that the applications are complementary rather than overlapping). According to some embodiments, the related items 510B may be presented in association with selectable input components which allow the user to engage with the recommended item, such as downloading the item and/or navigating to a landing page for the item within the framework.

Figure 6:
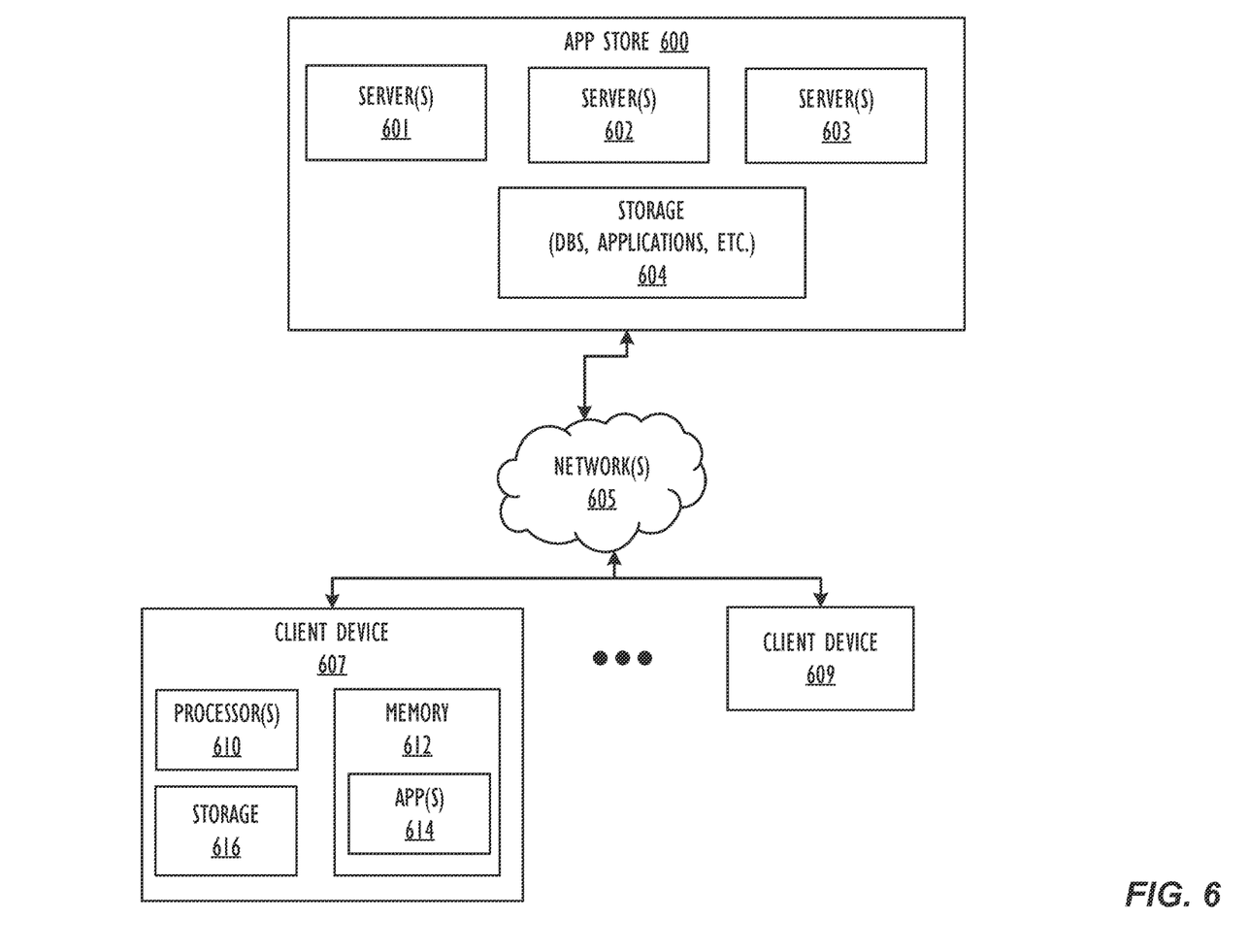
FIG. 6 illustrates an example network diagram in which a distribution platform may be provided, in accordance with one or more embodiments.

The embodiments described herein can operate within and interface with the environment and context of a distribution platform for which recommended items are provided. As one example, as described above with respect to FIG. 5, embodiments can be employed in the context of an app store from which one or more users, using client devices, can search for and download one or more applications (also referred to as apps). FIG. 6 depicts an example diagram of network devices across which embodiments described above can be practiced, in particular for this example, in the context of an app store.

An app store 600, or other distribution platform, can include one or more servers, such as servers 601, 602, and 603, that can provide the functionality described herein. For example, server(s) 601 can interface with a client device to implement the methods of FIGS. 2-3 to generate and/or provide recommendations for presentation at a client device, such as client devices 607 and 609, which can take a variety of different forms (e.g., tablet computer such as an iPad, smartphone such as an iPhone, laptop computer, desktop computer, network media player such as an Apple TV, game/entertainment system, or other consumer electronic device). The client devices 607 and 609 can be coupled to the app store 600 by one or more networks 605, such as the Internet, which provides for the data communication between the client devices and the app store so that the client devices can send search queries to the app store, receive search results, and send requests to download one or more apps and then receive the downloads of the one or more apps. The server(s) 601, in one embodiment, can create the data structures used in providing custom landing pages with particular suggested items based on a particular relationship to the item that is the subject of the landing page, and store those data structures in storage 604 for later use by server(s) 602 which can be configured to receive search queries from client devices and then perform searches of one or more data structures in order to provide a consistent view of representations of the landing pages for the apps within the app store.

An app store, such as the app store shown in FIG. 6 can collect information about user engagement with the applications, interaction with a recommended item section, downloads that result from a user's selection of an app shown in the search results produced by a search query, and the like. This information can be collected in logs maintained by the app store which record the user interaction with the platform interface. In one embodiment, the one or more servers 602 can maintain a record of queries used, the selections made from the search results of those queries, and interaction with items on a results page, such as which items are the subject of user engagement from a common search query. Further, in some embodiments, the one or more servers 602 can store the framework based on implicit and/or explicit similarity models from which related recommended items can be selected.

The servers (601, 602, 603) and/or the client devices 607 and 609 can also include memory for storing and/or retrieving apps from the app store 600. According to some embodiments, the client devices 607 and 609 may provide access to the app store 600, on which multiple applications may be hosted. The app store 600 may provide an app information page (or, in a broader sense, an item information page, such as a landing page) within the app store for a particular app (or, similarly, an item hosted by a distribution platform). That is, a view of a landing page from client device 607 may differ from a view of the app information page from client device 609 depending upon the relationship used for providing recommended items. In some embodiments, the client devices 607 and 609 may obtain a binary download package from the app store 600 and run the app locally within memory 612 as one of App(s) 614. That is, client device 607 may include a memory 612 which stores application data for execution by one or more processor(s) 610. Further, client device 607 may include one or more storage devices 616 configured to store data for utilizing the app(s) 614, and/or for accessing the app store 600, such as user profile information or the like.

Figure 7:
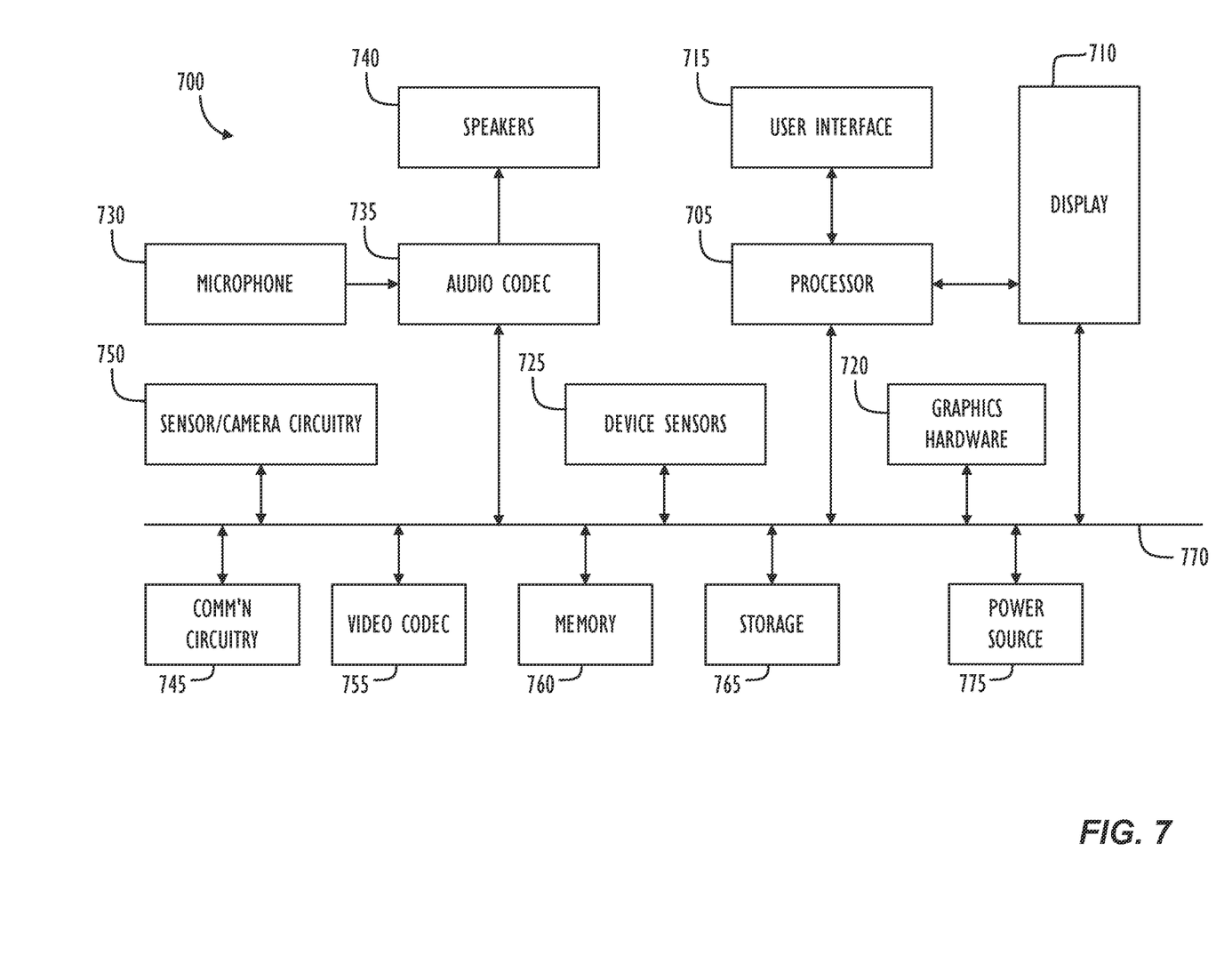
FIG. 7 illustrates a simplified functional block diagram of an illustrative programmable electronic device, in accordance with an embodiment.

Referring now to FIG. 7, a simplified functional block diagram of an illustrative programmable electronic device 700 for providing access to an app store is shown, according to one embodiment. Electronic device 700 could be, for example, a mobile telephone, personal media device, portable camera, tablet, notebook or desktop computer system. As shown, electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communication circuitry 745, image capture circuit 750 (which may comprise, e.g., multiple camera units/optical sensors having different characteristics as well as camera units that are housed outside of, but in electronic communication with, device 700), video codec(s) 755, memory 760, storage 765, and communications bus 770.

Processor 705 may execute instructions necessary to carry out or control the operation of many functions performed by device 700, such as the generation and/or processing of DAs in accordance with the various embodiments described herein. Processor 705 may, for instance, drive display 710 and receive user input from user interface 715. User interface 715 can take a variety of forms, such as a button, keypad, dial, a click wheel, keyboard, display screen and/or a touch screen. User interface 715 could, for example, be the conduit through which a user may view a captured video stream and/or indicate particular images(s) that the user would like to capture or share (e.g., by clicking on a physical or virtual button at the moment the desired image is being displayed on the device's display screen).

In one embodiment, display 710 may display a video stream as it is captured while processor 705 and/or graphics hardware 720 and/or image capture circuitry contemporaneously store the video stream (or individual image frames from the video stream) in memory 760 and/or storage 765. Processor 705 may be a system-on-chip such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 in performing computational tasks. In one embodiment, graphics hardware 720 may include one or more programmable graphics processing units (GPUs).

Image capture circuitry 750 may comprise one or more camera units configured to capture images, e.g., in accordance with this disclosure. Output from image capture circuitry 750 may be processed, at least in part, by video codec(s) 755, processor 705, graphics hardware 720, and/or a dedicated image processing unit incorporated within image capture circuitry 750. Images so captured may be stored in memory 760 and/or storage 765. Memory 760 may include one or more different types of media used by processor 705, graphics hardware 720, and image capture circuitry 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums, including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Memory 760 and storage 765 may be used to retain computer program instructions or code organized into one or more modules and written in any desired computer programming language. When executed, for example, by processor 705, such computer program code may implement one or more of the methods described herein. Power source 775 may comprise a rechargeable battery (e.g., a lithium-ion battery or the like) or other electrical connection to a power supply, e.g., to a main power source, that is used to manage and/or provide electrical power to the electronic components and associated circuitry of electronic device 700.

In the foregoing description, numerous specific details are set forth, such as specific configurations, properties, and processes, etc., in order to provide a thorough understanding of the embodiments. In other instances, well-known processes and manufacturing techniques have not been described in particular detail in order to not unnecessarily obscure the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one embodiment. Thus, the appearances of the phrase "for one embodiment," "for an embodiment," "for another embodiment," "in other embodiments," "in some embodiments," or their variations in various places throughout this specification are not necessarily referring to the same embodiment. Furthermore, the particular features, structures, configurations, or characteristics may be combined in any suitable manner in one or more embodiments.

In the above description and the following claims, the terms "coupled" and "connected," along with their derivatives, may be used. It should be understood that these terms are not intended as synonyms for each other. "Coupled" is used herein to indicate that two or more elements or components, which may or may not be in direct physical or electrical contact with each other, co-operate or interact with each other. "Connected" is used to indicate the establishment of communication between two or more elements or components that are coupled with each other.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as those set forth in the claims below, refer to the action and processes of a computer system, or similar electronic computing system, that manipulates and transforms data represented as physical (electronic) quantities within the computer system's registers and memories into other data similarly represented as physical quantities within the computer system memories or registers or other such information storage, transmission or display devices.

Embodiments described herein can relate to an apparatus for performing a computer program (e.g., the operations described herein, etc.). Such a computer program may be stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Although operations or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the various embodiments of the disclosed subject matter. In utilizing the various aspects of the embodiments described herein, it would become apparent to one skilled in the art that combinations, modifications, or variations of the above embodiments are possible for managing components of a processing system to increase the power and performance of at least one of those components. Thus, it will be evident that various modifications may be made thereto without departing from the broader spirit and scope of at least one of the disclosed concepts set forth in the following claims. The specifications and drawings are, accordingly, to be regarded in an illustrative sense, rather than a restrictive sense.

In the development of any actual implementation of one or more of the disclosed concepts (e.g., a software and/or hardware development project, etc.), numerous decisions must be made to achieve the developers' specific goals (e.g., compliance with system-related constraints and/or business-related constraints). These goals may vary from one implementation to another, and this variation could affect the actual implementation of one or more of the disclosed concepts set forth in the embodiments described herein. Such development efforts might be complex and time-consuming but may still be a routine undertaking for a person having ordinary skill in the art of the design and/or implementation of one or more of the inventive concepts set forth in the embodiments described herein.

As described above, one aspect of the present technology is the gathering and use of data available from various sources to improve the delivery to users of suggested catalog items, such as apps in an app store or the like. The present disclosure contemplates that in some instances, this gathered data may include personal information data that may uniquely identify or can be used to contact or locate a specific person. Such personal information data can include demographic data, location-based data, telephone numbers, email addresses, social media handles, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine the most useful version of a landing page. Accordingly, use of such personal information data enables users to have more streamlined and meaningful control of their experience with a service, such as an app store. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of personalized search landing pages, the present technology can be configured to allow users to select to "opt in" or "opt out" of participation in the collection of personal information data during registration for services or anytime thereafter. In another example, users can select not to provide their content and other personal information data for improved content sharing suggestion services. In yet another example, users can select to limit the length of time their personal information data is maintained by a third party, limit the length of time into the past from which content sharing suggestions may be drawn, and/or entirely prohibit the development of a knowledge graph or other metadata profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth, etc.), controlling the amount or specificity of data stored (e.g., collecting location data at city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be suggested for sharing to users by inferring preferences based on non-personal information data or a bare minimum amount of personal information, such as the quality level of the content (e.g., focus, exposure levels, etc.), the fact that certain content is being requested by a device associated with a contact of the user, other non-personal information available to the app store, or publicly available information.

As used in the description above and the claims below, the phrases "at least one of A, B, or C" and "one or more of A, B, or C" include A alone, B alone, C alone, a combination of A and B, a combination of B and C, a combination of A and C, and a combination of A, B, and C. That is, the phrases "at least one of A, B, or C" and "one or more of A, B, or C" mean A, B, C, or any combination thereof, such that one or more of a group of elements consists of A, B and C, and should not be interpreted as requiring at least one of each of the listed elements A, B and C, regardless of whether A, B and C are related as categories or otherwise. Furthermore, the use of the article "a" or "the" in introducing an element should not be interpreted as being exclusive of a plurality of elements. Also, the recitation of "A, B, and/or C" is equal to "at least one of A, B, or C." Also, the use of "a" refers to "one or more" in the present disclosure.

In a first example, a method comprises: receiving a request to present a landing page for a seed application within a distribution platform interface; identifying, based on the seed app, one or more candidate related apps, wherein the one or more candidate apps are selected based on a detected item-to-item relationship between the seed app and the one or more candidate apps; and presenting an indication of at least one of the one or more candidate related apps on the landing page for the seed application.

Example 2 includes the Example of claim 1, wherein the item-to-item relationship is based, at least in part, on a complementarity score, wherein the complementarity score is based on a number of user instances for which the seed app and the candidate app are co-downloaded.

Example 3 includes any of Examples 1-2, wherein the item-to-item relationship is based, at least in part, on a relevance score, wherein the relevance score indicates a similarity metrics comprising at least one selected from a group consisting of content management tags and a topic modeling based on app descriptions for each of the candidate apps.

Example 4 includes Example 3, wherein the relevance score is further based on a co-engagement metric for the seed app and the one or more candidate apps.

Example 5 includes Example 3, wherein the relevance score is further based on a rate at which the seed app and each of the candidate apps are downloaded after being presented as a search result from a common search query.

Example 6 includes Example 5, further comprising: detecting engagement with a particular candidate app in the distribution platform interface; and adjusting the relevance score between the particular candidate app and the seed app in accordance with the detected engagement.

Example 7 includes any of Examples 1-6, wherein the indication of the at least one of the one or more candidate related apps is presented with a user selectable component which, when selected, causes the distribution platform interface to navigate to a landing page for the associated candidate related app.

Example 8 includes any of Examples 1-7, further comprising: selecting a relationship type for the one or more candidate apps, wherein the one or more candidate apps are associated with the relationship type based on the seed app.

Example 9 includes Example 8, further comprising: determining an engagement state for the seed app, wherein the relationship type is selected based on the engagement state for the seed app.

Example 10 includes a non-transitory computer readable medium comprising computer readable code executable by one or more processors to perform the method of any of Examples 1-9.

Example 11 includes a system comprising: one or more processors; and one or more computer readable media comprising computer readable code executable by one or more of the processors to: receive a request to present a landing page for a seed application within a distribution platform interface; identify, based on the seed app, one or more candidate related apps, wherein the one or more candidate apps are selected based on a detected item-to-item relationship between the seed app and the one or more candidate apps; and present an indication of at least one of the one or more candidate related apps on the landing page for the seed application.

Example 12 includes the system of Example 11, wherein the item-to-item relationship is based, at least in part, on a complementarity score, wherein the complementarity score is based on a number of user instances for which the seed app and the candidate app are co-downloaded.

Example 13 includes the system of any of Examples 11-12, wherein the item-to-item relationship is based, at least in part, on a relevance score, wherein the relevance score indicates a similarity metrics comprising at least one selected from a group consisting of content management tags and a topic modeling based on app descriptions for each of the candidate apps.

Example 14 includes the system of Example 13, wherein the relevance score is further based on a co-engagement metric for the seed app and the one or more candidate apps.

Example 15 includes the system of Example 13, wherein the relevance score is further based on a rate at which the seed app and each of the candidate apps are downloaded after being presented as a search result from a common search query.

Example 16 includes Example 15, further comprising computer readable code to detect engagement with a particular candidate app in the distribution platform interface; and adjust the relevance score between the particular candidate app and the seed app in accordance with the detected engagement.

Example 17 includes any of Examples 11-16, wherein the indication of the at least one of the one or more candidate related apps is presented with a user selectable component which, when selected, causes the distribution platform interface to navigate to a landing page for the associated candidate related app.

Example 18 includes any of Examples 11-17, further comprising computer readable code to select a relationship type for the one or more candidate apps, wherein the one or more candidate apps are associated with the relationship type based on the seed app.

Example 19 includes Example 18, further comprising computer readable code to determine an engagement state for the seed app, wherein the relationship type is selected based on the engagement state for the seed app.

What is claimed is:

1. A method comprising:
responsive to a request to present a landing page for a seed application within a distribution platform interface, determining a target relationship type of a plurality of target relationship types based on characteristics associated with the seed application;
identifying, based on the seed application and the target relationship type, one or more candidate related applications, wherein the one or more candidate related applications are selected based on an item-to-item relationship between the seed application and the one or more candidate related applications; and
presenting an indication of at least one of the one or more candidate related applications on the landing page for the seed application.

2. The method of claim 1, wherein the item-to-item relationship is based, at least in part, on a complementarity score, wherein the complementarity score is based on a number of user instances for which the seed application and the candidate related applications are co-downloaded.

3. The method of claim 1, wherein the item-to-item relationship is based, at least in part, on a relevance score, wherein the relevance score indicates a similarity metrics comprising at least one selected from a group consisting of content management tags and a topic modeling based on app descriptions for each of the candidate related applications.

4. The method of claim 3, wherein the relevance score is further based on a co-engagement metric for the seed application and the one or more candidate related applications.

5. The method of claim 3, wherein the relevance score is further based on a rate at which the seed application and each of the candidate related applications are downloaded after being presented as a search result from a common search query.

6. The method of claim 5, further comprising:
detecting engagement with a particular candidate related application in the distribution platform interface; and
adjust the relevance score between the particular candidate related application and the seed application in accordance with the detected engagement.

7. The method of claim 1, wherein the indication of the at least one of the one or more candidate related applications is presented with a user selectable component which, when selected, causes the distribution platform interface to navigate to a landing page for an associated candidate related application.

8. The method of claim 1, further comprising:
selecting a relationship type for the one or more candidate related applications,
wherein the one or more candidate related applications are associated with the relationship type based on the seed app.

9. The method of claim 8, further comprising:
determining an engagement state for the seed application,
wherein the relationship type is selected based on the engagement state for the seed application.

10. A non-transitory computer readable medium comprising computer readable code executable by one or more processors to:
responsive to a request to present a landing page for a seed application within a distribution platform interface, determine a target relationship type of a plurality of target relationship types based on characteristics associated with the seed application;
identify, based on the seed application and the target relationship type, one or more candidate related applications, wherein the one or more candidate related applications are selected based on an item-to-item relationship between the seed application and the one or more candidate related applications; and
present an indication of at least one of the one or more candidate related apps on the landing page for the seed application.

11. The non-transitory computer readable medium of claim 10, wherein the item-to-item relationship is based, at least in part, on a relevance score, wherein the relevance score indicates a similarity metrics comprising at least one selected from a group consisting of content management tags and a topic modeling based on app descriptions for each of the candidate related applications.

12. The non-transitory computer readable medium of claim 11, wherein the relevance score is further based on a co-engagement metric for the seed application and the one or more candidate related applications.

13. The non-transitory computer readable medium of claim 12, wherein the relevance score is further based on a rate at which the seed application and each of the candidate related applications are downloaded after being presented as a search result from a common search query.

14. The non-transitory computer readable medium of claim 10, wherein the indication of the at least one of the one or more candidate related applications is presented with a user selectable component which, when selected, causes the distribution platform interface to navigate to a landing page for the associated candidate related application.

15. The non-transitory computer readable medium of claim 10, further comprising:
selecting a relationship type for the one or more candidate related applications,
wherein the one or more candidate related applications are associated with the relationship type based on the seed app.

16. The non-transitory computer readable medium of claim 15, further comprising:
determining an engagement state for the seed application,
wherein the relationship type is selected based on the engagement state for the seed application.

17. A system comprising:
one or more processors; and
one or more computer readable media comprising computer readable code executable by one or more of the processors to:
responsive to a request to present a landing page for a seed application within a distribution platform interface, determine a target relationship type of a plurality of target relationship types based on characteristics associated with the seed application;
identify, based on the seed app, one or more candidate related applications, wherein the one or more candidate related applications are selected based on an item-to-item relationship between the seed application and the one or more candidate related applications; and
present an indication of at least one of the one or more candidate related applications on the landing page for the seed application.

18. The system of claim 17, wherein the item-to-item relationship is based, at least in part, on a complementarity score, wherein the complementarity score is based on a number of user instances for which the seed application and the candidate related application are co-downloaded.

19. The system of claim 17, wherein the item-to-item relationship is based, at least in part, on a relevance score, wherein the relevance score indicates a similarity metrics comprising at least one selected from a group consisting of content management tags and a topic modeling based on app descriptions for each of the candidate related applications.

20. The system of claim 19, wherein the relevance score is further based on a co-engagement metric for the seed application and the one or more candidate related applications.

* * * * *